US010449925B2

(12) United States Patent
Tastekin

(10) Patent No.: US 10,449,925 B2
(45) Date of Patent: Oct. 22, 2019

(54) DEFLECTOR FOR REDUCED HEAD INJURY CRITERION

(71) Applicant: TOYOTA MOTOR EUROPE, Brussels (BE)

(72) Inventor: Ozgur Tastekin, Everberg (BE)

(73) Assignee: TOYOTA MOTOR EUROPE, Brussels (BE)

( * ) Notice: Subject to any disclaimer, the term of this patent is extended or adjusted under 35 U.S.C. 154(b) by 190 days.

(21) Appl. No.: 15/535,891

(22) PCT Filed: Dec. 17, 2014

(86) PCT No.: PCT/EP2014/078290
§ 371 (c)(1),
(2) Date: Jun. 14, 2017

(87) PCT Pub. No.: WO2016/095995
PCT Pub. Date: Jun. 23, 2016

(65) Prior Publication Data
US 2018/0354452 A1 Dec. 13, 2018

(51) Int. Cl.
B60R 21/34 (2011.01)
B62D 25/08 (2006.01)

(52) U.S. Cl.
CPC ............ B60R 21/34 (2013.01); B62D 25/081 (2013.01); B60R 2021/343 (2013.01)

(58) Field of Classification Search
CPC .............................. B60R 21/34; B62D 25/081
USPC ............................................ 296/187.04, 192
See application file for complete search history.

(56) References Cited

U.S. PATENT DOCUMENTS 7,552,964 B2 *  6/2009  Saito .......................... B60J 1/02
                                                    296/187.04
2011/0076435 A1*  3/2011  Tachibana ............ B62D 25/081
                                                        428/43
2012/0091756 A1  4/2012  Suzuki
(Continued)

FOREIGN PATENT DOCUMENTS

DE  102004041269 A1  3/2006
EP      2441650 A2    4/2012
EP      2679471 A1    1/2014
(Continued)

OTHER PUBLICATIONS

Japanese Office Action dated Aug. 21, 2018 in Japanese Patent Application No. 2017-531888 (with English translation), 6 pages.
(Continued)

Primary Examiner — Joseph D. Pape
(74) Attorney, Agent, or Firm — Oblon, McClelland, Maier & Neustadt, L.L.P.

(57) ABSTRACT

An air deflector for a vehicle cowl is provided. The air deflector includes a first side extending parallel to a longitudinal axis of the vehicle, an attachment portion configured for attaching the air deflector to the vehicle, resulting in an attached configuration, a second side opposite and parallel to the first side, wherein when in the attached configuration, the second side faces inward toward a centerline of the vehicle, and a hinged portion positioned on the first and/or second side such that a force applied at a top portion of the air deflector in the attached configuration causes deformation of the air deflector along the hinged portion.

12 Claims, 3 Drawing Sheets

(56) References Cited

U.S. PATENT DOCUMENTS

2013/0320712 A1    12/2013    Murofushi et al.

FOREIGN PATENT DOCUMENTS

| JP | 2007-137363 A | 6/2007 |
|----|---------------|--------|
| JP | 2007-245748 A | 9/2007 |
| JP | 2008-56106 A  | 3/2008 |
| JP | 2010-167943 A | 8/2010 |
| JP | 2010-168036 A | 8/2010 |
| JP | 2012-61876 A  | 3/2012 |

OTHER PUBLICATIONS

International Search Report dated Aug. 5, 2015, in PCT/EP2014/078290, filed Dec. 17, 2014.
Office Action dated Apr. 2, 2019 in the corresponding Japanese Patent Application No. 2017-531888 with English Translation.

* cited by examiner

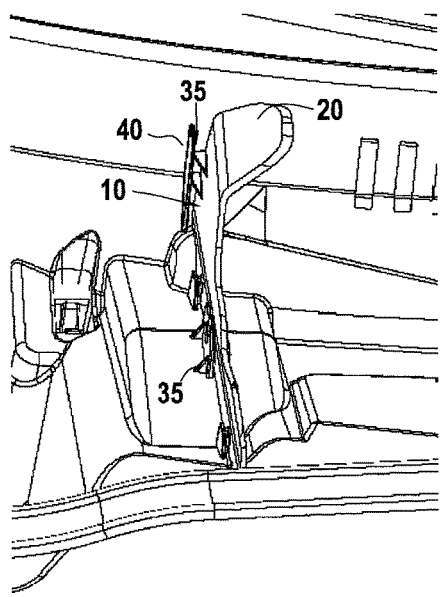
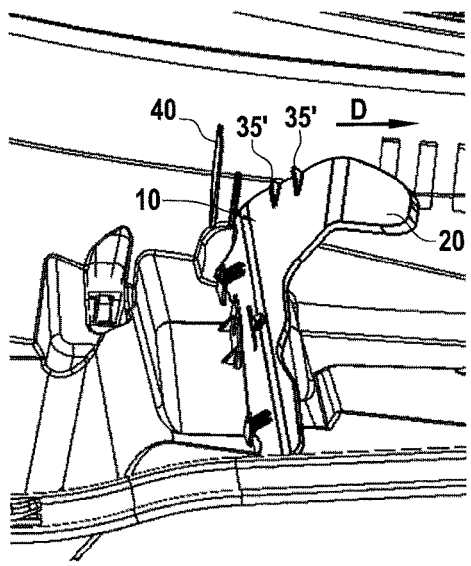
FIG.3A                    FIG.3B
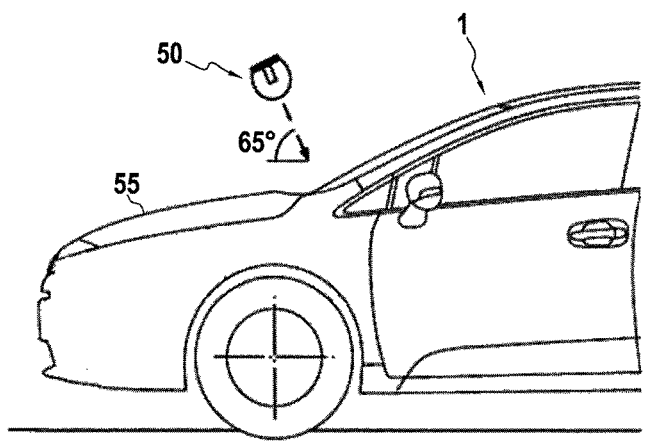
FIG.4

DEFLECTOR FOR REDUCED HEAD INJURY CRITERION

FIELD OF THE DISCLOSURE

The present disclosure is related to passive devices for improving motor vehicle/pedestrian impact safety, and more particularly to a deflector configured to reduce head injury criterion during impact with a vehicle.

BACKGROUND OF THE DISCLOSURE

Vehicle safety ratings are an important factor in the design of a vehicle and can have significant impact with regard to governmental approval and decision making by purchasers of vehicles, among others.

One particular element for establishing a vehicle's safety rating relates to head injury criterion (HIC). HIC may be evaluated both for the driver and passengers of a vehicle, as well as for third-parties who may become involved in a collision with the vehicle, e.g., pedestrians, cyclists, motorcyclists, etc.

In order to test HIC for a vehicle, adult and child "headforms" (i.e., an impactor) are subjected to impacts at various angles of impact at various areas on the hood of a vehicle at a predetermined speed, and the results for each impact recorded.

Values for HIC may be calculated based on an accelerometer installed in the impactor according to equation (1)

$$HIC = \left\{ \left[ \frac{1}{t_2 - t_1} \int_{t_1}^{t_2} a(t)dt \right]^{2.5} (t_2 - t_1) \right\}_{max} \quad (1)$$

where $t_1$ and $t_2$ are the initial and final times (in seconds) of the interval during which HIC attains a maximum value, and acceleration a is measured in gs (standard gravity acceleration).

In the past, car manufacturers have installed pedestrian protection airbags or active hood systems to enhance the pedestrian protection features. Such active systems can be costly and difficult to design/construct.

In addition to active systems, passive designs have also been implemented. However, while such passive systems are less expensive, there is a desire to continually to improve such systems so as to reduce the possibility of injury.

JP 2007-331521 discloses a duct part of an outside air introducing duct for a vehicle that is deformable and crushed by a load from an upper part.

SUMMARY OF THE DISCLOSURE

Currently, it remains desirable to provide vehicle structures capable of reducing HIC with the goal of reducing injury to pedestrians during collision with a vehicle.

It has been determined that prior systems include a relatively stable (i.e., designed to stay in place permanently) and rigid air deflector, configured to prevent air heated by the engine from entering a cool air intake for the cabin. Such stable and rigid air deflectors may not deform upon impact and may therefore may cause an increase in HIC values.

Therefore, according to embodiments of the present disclosure an air deflector for a vehicle cowl is provided. The air deflector includes a first side extending parallel to a longitudinal axis of the vehicle, attachment means configured for removably attaching the air deflector to the vehicle, resulting in an attached configuration, a second side opposite and parallel to the first side, wherein when in the attached configuration, the second side faces inward toward a centerline of the vehicle, and a hinged portion positioned on the first and/or second side such that a force applied at a top portion of the air deflector in the attached configuration causes deformation of the air deflector along the hinged portion.

By providing such an air deflector, a force of impact on the deflector (e.g., via a hood of a vehicle) can be better absorbed through deflection and deformation of the air deflector along the hinged portion. Unlike prior art air deflectors that are rigid, the present air deflector can significantly reduce HIC.

The hinge may include an area of reduced thickness of the air deflector. For example, the hinged portion may comprise a living hinge type hinge.

The hinged portion may extend over a length of the air deflector, preferably in proximity to a base portion.

Prior to deforming, at least a portion of the top portion of the air deflector may be angled in a direction of intended deformation. For example, the angle of the top portion may lie in a range between 30 and 85 degrees, better, between 45 and 80 degrees, and still better, 50 and 75 degrees from horizontal when in the attached configuration.

The air deflector may be configured to deform substantially in a direction toward the centerline of the vehicle. When used in this context, the term "substantially" is intended to mean that following an impact, a majority (i.e., greater than 50 percent) of the deformed portion of the air deflector has been deflected in a deformation direction, e.g., toward the centerline of the vehicle.

The attachment means may include one or more pin and hole structures.

The air deflector may be configured such that force applied at a top portion of the air deflector causes at least partial detachment of the attachment means.

At least one of the first side and the second side may be configured to interact with one or more protrusions on the vehicle cowl to maintain the attached configuration, particularly, prior to an impact on the air deflector.

The top portion of the air deflector may be configured to interact with a hood of the vehicle during an impact to facilitate the deformation.

According to further embodiments of the present disclosure, a vehicle including one or more of the air deflectors according to any of the preceding aspects is provided.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 3A is a schematic perspective view of an air deflector according to the present disclosure at a point in time before application of an impact force;

FIG. 3B is a schematic perspective view of the air deflector of FIG. 3A following application of the impact force;

FIG. 4 is a schematic representation of an exemplary HIC test carried out on a vehicle.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1A:
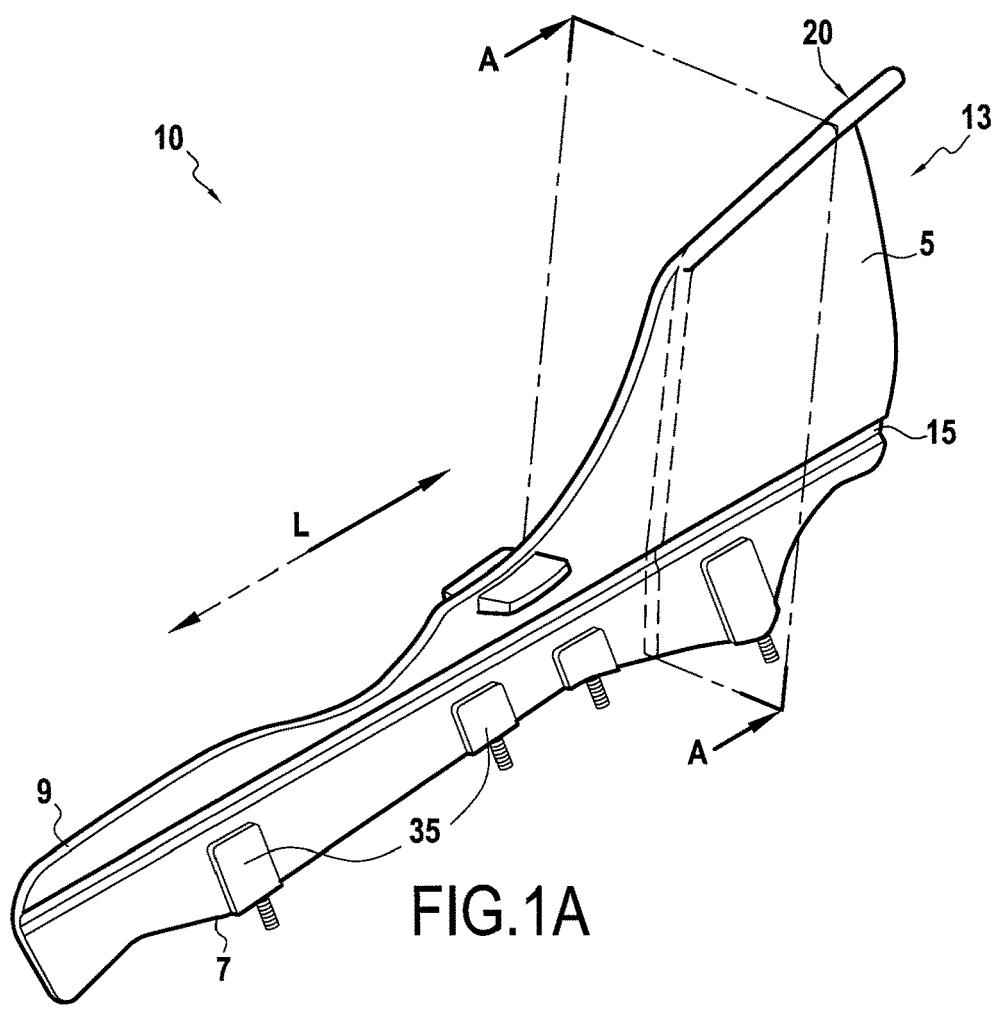
FIG. 1A shows an exemplary air deflector according to embodiments of the present disclosure.
Figure 1B:
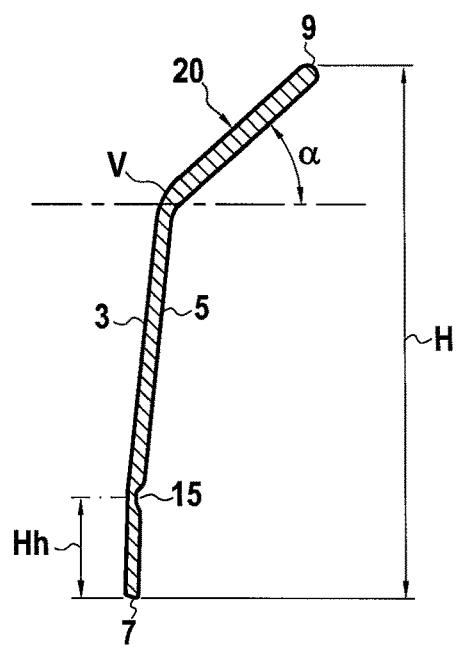
FIG. 1B is a cross-sectional view along A-A of FIG. 1A.

FIG. 1A shows an exemplary air deflector 10 (e.g., a hot air deflector) according to embodiments of the present disclosure, while FIG. 1B is a cross-sectional view along A-A of FIG. 1A. Air deflector 10 may be configured to deflect air passing over a portion 30 of cowl 33 from entering a cabin fresh-air intake duct 25 also located on cowl 33 of vehicle 1 (shown at FIG. 4). For example, as vehicle 1 moves forward, heated air coming from an engine compartment (not shown) of vehicle 1 may pass through both sides of cowl 30. It is generally desirable to limit or prevent such warmed air from passing into fresh-air intake 25 and being entrained into a cabin of vehicle 1.

When air deflector 10 is installed in vehicle 1 (e.g., affixed to cowl 33 by attachment means 35) it is to be understood that this represents an "attached configuration" and the attached configuration provides a frame of reference for discussion with regard to certain elements described herein.

Air deflector 10 may be generally shaped to substantially conform with contours of a vehicle (e.g., hood, cowl, etc.) and may include a first side 3, a second side 5, one or more attachment means 35, a top portion 20, and a hinged portion 15. In addition, air deflector 10 may include a base 7 and/or one or more edges 9 configured to interact with portions of a vehicle (e.g., vehicle hood 55).

Air deflector 10 may comprise any suitable material, for example, metal (e.g., aluminum, steel, etc.) plastic (e.g., polystyrene, polypropylene, polyamide, etc.), and may be formed using any suitable process (e.g., stamping, forging, cutting, compression molding, injection molding) or combination of processes.

First side 3 may extend lengthwise along a longitudinal axis, which, when in the attached configuration extends substantially parallel to a longitudinal centerline of vehicle 1. While vehicle 1 is not shown in its entirety in FIGS. 1A or 1B, one of skill in the art will understand that air inlet 25 is intended to be present on a portion of the cowl 33 of a vehicle, which inherently has a length (i.e., measured from a front to a back of the vehicle). First side 3 may be configured to deflect a portion of heated air passing from an engine compartment to an outside of vehicle 1, to prevent such heated air from passing into cabin air intake 25, for example.

Figure 2A:
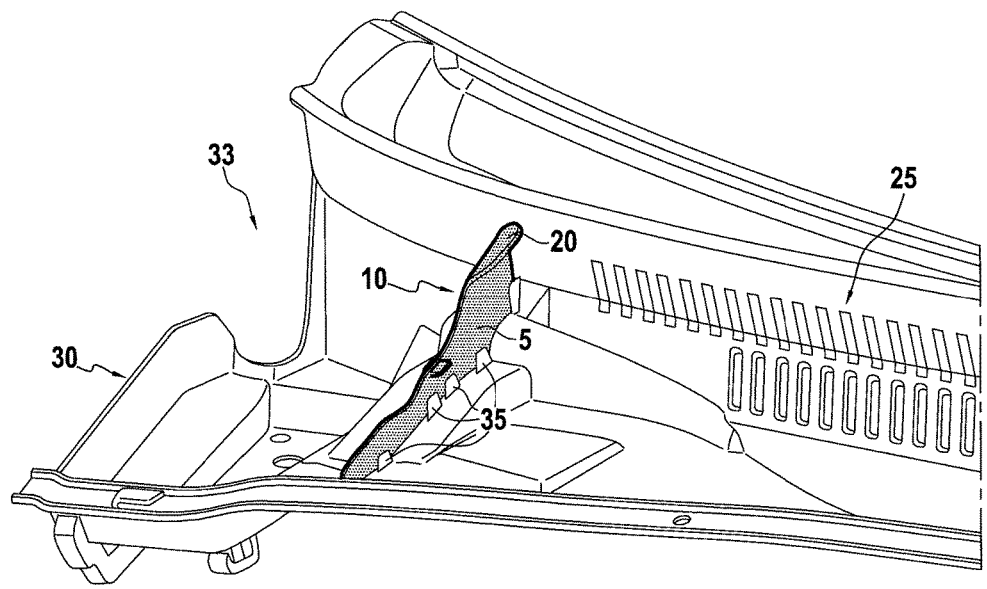
FIG. 2A is a first perspective view of an air deflector in an attached configuration according to embodiments of the present disclosure.
Figure 2B:
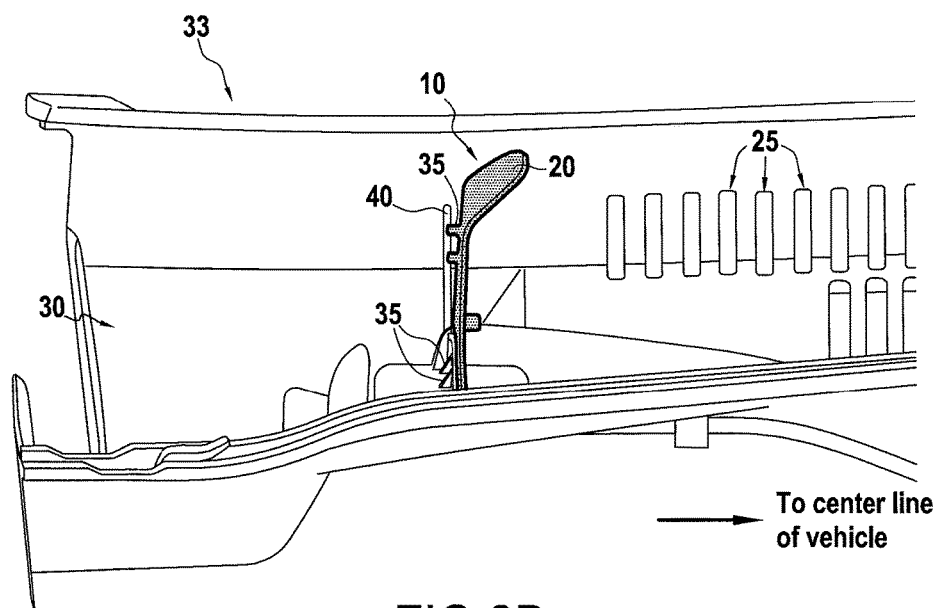
FIG. 2B is a second perspective view of an air deflector in an attached configuration.

Second side 5 may be opposite and parallel to first side 3, and when in the attached configuration as shown at FIGS. 2A and 2B (i.e., attached by base 7 to cowl 33 of vehicle 1), the second side may face inward toward a centerline of the vehicle.

One or more attachment means 35 may be configured to enable removable attachment of air deflector 10 to cowl 33 of vehicle 1. Attachment means may, therefore, comprise various fasteners (e.g., screws, clips, rivets, etc.) or, for example, pins and/or studs configured to be received by holes at a mounting location.

One or more attachment means 35 may be configured to interact with features (e.g., holes) present in cowl 33 to facilitate the removable attachment of attachment means 35. For example, where pins are provided as one or more of attachment means 35, such pins may be configured to be inserted into holes (not shown) provided in cowl 33. Such holes may be configured such that an interference fit is achieved with attachment means 35, thereby, maintaining air deflector 10 in an attached configuration at least prior to impact on air deflector 10. Once air deflector 10 has been attached by way of attachment means 35, it may be possible to remove air deflector without the use of tools by exerting a force (e.g., a pulling and/or pushing) upon air deflector 10.

Attachment means 35 may be positioned at various locations along base 7 among others. Alternatively, or in addition, attachment means may be provided at a rear portion 13 of air deflector 10. One of skill in the art will recognize that more or fewer attachment means 35 may be provided depending on a particular design (e.g., based on vehicle size, etc.).

Attachment means 35 may be formed integrally as part of air deflector 10, as separate elements joined (e.g., by welding) to attachment means 35 after fabrication of air deflector 10, or a combination thereof. For example, attachment means 35 may be spot-welded to air deflector 10 so as to align with holes present in a vehicle in which air deflector 10 is to be installed. This may enable more flexibility with regard to vehicle installation.

At least a portion of a top portion 20 of air deflector 10 may be angled in a direction of intended deformation. For example, top portion 20 may be angled at an angle $\alpha$ from horizontal (as measured in the attached configuration) and configured to aid in air deflection as well as in deformation during impact. In embodiments where deformation is desired toward centerline of vehicle 1, for example, top portion 20 may be angled toward the centerline of vehicle 1 at an angle $\alpha$ from horizontal. Angle $\alpha$ may range between about 30 and 80 degrees from horizontal as measure in the attached configuration. Top portion 20 may comprise a portion having a length of between about 1 to 50 percent of an overall length L of a top edge 9 of air deflector 10 and a height of between about 5 to 40 percent of an overall height H of air deflector 10 as measured in the attached configuration. That is to say, as measured in the attached configuration from vertex V of angle $\alpha$, a height of top portion 20 and a length of top portion 20 may meet the above-recited criteria.

Hinged portion 15 may be configured such that a force applied at top portion 20 of air deflector 10 in the attached configuration, causes deformation of air deflector 10 along hinged portion 15. Hinged portion 15 may comprise, for example, an area of reduced thickness over the length L of material forming air deflector 10. According to some embodiments, hinged portion 15 may be similar to a living hinge (i.e., a flexure bearing type hinge) in which a reduction of material thickness at the area of the hinge results in additional flexibility along the hinge location. One of skill in the art will recognize that while hinge portion 15 is described and shown herein as covering an entire length L of air deflector 10, this is exemplary only, and varying lengths may be selected for hinged portion 15 depending on a given design.

Hinged portion 15 may be formed during fabrication of air deflector 10, for example, as a result of stamping, forging, molding, casting, injection etc. Alternatively, hinged portion may be formed following fabrication of air deflector 10 by a material removal process, such as cutting (e.g., by laser) or milling. For example, a CNC machine may be configured to remove material from hinged portion 15 to a desirable depth to render hinge portion 15 less rigid than surrounding material of air deflector 10.

Hinged portion 15 may be positioned on first side 3 and/or second side 5, for example, at a location above base 7. According to some embodiments, hinged portion 15 may be located at a height $H_h$ of approximately 5 to 40 percent of overall height H of air deflector 10, as measured from base 7.

Turning to FIGS. 3A, 3B and 4, measurement of HIC by application of a force to air deflector 10 via an impactor 50 will be described. As shown at FIG. 3A, air deflector 10 has been placed in the attached configuration. That is to say, attachment means 35 have been removably attached to cowl 33 and air deflector 10. One or more protrusions 40 (e.g., ribs) may be present on cowl 33 of vehicle 1 to aid in maintaining air deflector 10 in the attached configuration and/or to encourage deflection of air deflector in a desired direction (e.g., toward a centerline of vehicle 1). For example, such protrusions may be configured to cause an interference fit of air deflector 10 in the attached configuration, such that a stress is constantly applied (e.g., toward a deformation direction) on air deflector 10. In other words, air deflector 10 may be "pre-stressed" to further encourage deformation in a preferred direction.

A hood 55 of vehicle 1 (shown at FIG. 4) has been removed in FIGS. 3A and 3B for clarity, however, a portion of top edge 9 of air deflector 10 may be in contact or very nearly in contact with hood 55 so as to enable interaction between hood 55 and top edge 9 of air deflector 10 during an impact.

During a test of HIC, which is intended to simulate a collision between a pedestrian and vehicle 1, impactor 50 is accelerated toward vehicle 1, and more particularly toward hood 55 at the location of air deflector 10. The acceleration is designed to achieve a desired momentum of impactor 50 in a direction (e.g., at between 50 and 70 degrees to horizontal) for generating an impact force on hood 55.

Upon impact on hood 55, impactor 50 exerts a force on air deflector 10 via hood 55, for example, at or near top portion 20, thereby causing deformation of air deflector 10 along hinge portion 15 in a deformation direction D.

As shown at FIG. 3B, in addition to deflection along hinge portion 15, one or more attachment means 35' may also be detached during the impact, either via breakage, forced release, and/or other means, thereby further enhancing the deformation and impact absorbing functionality of air deflector 10.

In comparison with a rigid unmodified air deflector of the prior art, substantial reduction in HIC may be achieved by implementation of embodiments of the present disclosure. For example, HIC values of a prior art air deflector may be above regulation thresholds, while air deflectors of the present disclosure may have HIC values below, and even well below regulation thresholds.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. An air deflector for a vehicle cowl, comprising:
   a first side extending parallel to a longitudinal axis of the vehicle;
   an attachment portion configured for attaching the air deflector to the vehicle, resulting in an attached configuration;
   a second side opposite and parallel to the first side, wherein when in the attached configuration, the second side faces inward toward a centerline of the vehicle; and
   a hinged portion positioned on at least one of the first side or second side such that a force applied at a top portion of the air deflector in the attached configuration causes deformation of the air deflector along the hinged portion wherein,
   prior to deforming, at least a portion of the top portion of the air deflector is angled toward the centerline of the vehicle, and
   the air deflector is configured to interact with one or more protrusions on the vehicle cowl such that a constant stress is applied to the air deflector configured to encourage deformation of the air deflector toward the centerline of the vehicle.

2. The air deflector according to claim 1, wherein the hinge comprises an area of reduced thickness of the air deflector.

3. The air deflector according to claim 1, wherein the hinged portion comprises a living hinge.

4. The air deflector according to claim 1, wherein the hinged portion extends over a length of the air deflector.

5. The air deflector according to claim 1, wherein the angle of the top portion lies in a range between 45 and 80 degrees from horizontal when in the attached configuration.

6. The air deflector according to claim 1, wherein the attachment portion comprises one or more pin and hole structures.

7. The air deflector according to claim 1, wherein the attachment portion are configured such that a force applied at a top portion of the air deflector causes at least partial detachment of the attachment portion via at least one of breakage or forced release.

8. The air deflector according to claim 1, wherein at least one of the first side and the second side is configured to interact with said one or more protrusions on the vehicle cowl to maintain the attached configuration.

9. The air deflector according to claim 1, wherein the top portion of the air deflector is configured to interact with a hood of the vehicle during an impact to facilitate the deformation.

10. A vehicle comprising one or more of the air deflectors according to claim 1.

11. The air deflector according to claim 1, wherein the one or more protrusions on the vehicle cowl cause an interference fit with the air deflector in the attached configuration.

12. The air deflector according to claim 4, wherein the hinged portion extends over the length of the air deflector in proximity to a base portion.

* * * * *